March 9, 1948.  R. L. PEEK, JR  2,437,270
MAGNETOSTRICTIVE COMPRESSIONAL WAVE TRANSMITTER OR RECEIVER
Filed Nov. 5, 1943
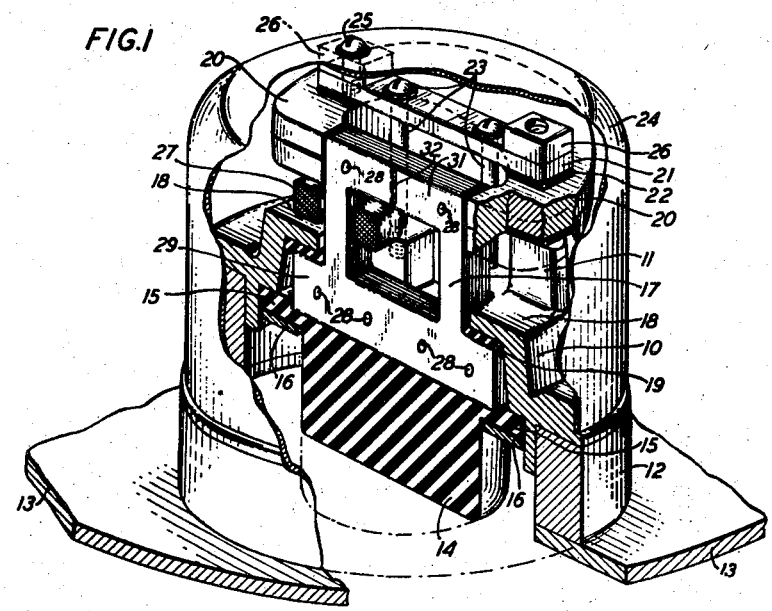
INVENTOR
R. L. PEEK, JR.
BY
Walter C. Kiesel
ATTORNEY Patented Mar. 9, 1948

2,437,270

UNITED STATES PATENT OFFICE 2,437,270

MAGNETOSTRICTIVE COMPRESSIONAL WAVE TRANSMITTER OR RECEIVER

Robert L. Peek, Jr., Short Hills, N. J., assignor to Bell Telephone Laboratories, Incorporated, New York, N. Y., a corporation of New York Application November 5, 1943, Serial No. 509,085

8 Claims. (Cl. 177—386)

1

This invention relates to magnetostrictive devices and more particularly to supersonic submarine signal translating devices of the magnetostrictive type.

Magnetostrictive devices comprise, in general, a core of magnetostrictive material, a signal coil electromagnetically coupled to the core and means for polarizing the core to establish in the effective parts thereof a biasing flux conducive to the realization of large magnetostrictive action. The over-all magnetic efficiency of such devices is dependent upon a number of factors principal among which are the reluctance of the core to the flow of alternating flux therein and the energy required to establish the requisite direct current biasing flux in the effective parts of the core. It has been proposed, heretofore, to obtain a low reluctance for the alternating flux path by constructing the core so that in itself it defines a closed series path for the alternating flux, and to bias the core by a permanent magnet separate from the core. In one proposed construction, the core was in the form of a rectangular loop and one pair of parallel legs thereof was biased in the same direction.

In submarine signaling devices wherein the magnetostrictive core comprises parallel legs, simplicity of construction and mode of operation dictates that the parallel legs operate cophasally, that is, that the legs expand and contract in the same direction in response to a signal flux impressed upon the core or that the effect of the legs when actuated in response to signal waves be cumulative. Hence, if the core be in the form of a rectanguluar loop, it is necessary that the parallel operative legs thereof be polarized oppositely. In such event, difficulties are encountered due to the possibility of magnetic saturation of other parts of the core with consequent substantial increase of the total reluctance of the path for the alternating flux. If such parts are made of sufficient cross-section to avoid saturation thereof when the polarizing flux in the parallel legs is of the requisite density, the capacity of the polarizing magnet must be large, so that the magnetic efficiency of the device is reduced.

One object of this invention is to improve the construction and efficiency of magnetostrictive devices of the type having a core defining a series magnetic circuit for alternating flux. More specifically, one object of this invention is to improve the magnetic and conversion efficiencies of supersonic submarine signaling devices comprising a rectangular magnetostrictive core which is polarized by a permanent magnet and parallel portions or legs of which elongate and contract in the same direction in accordance with signal fluxes impressed upon the core or compressional waves effective upon the core.

In one illustrative embodiment of the invention, a supersonic signaling device comprises a laminated rectangular core of magnetostrictive material, the core being mounted to be freely vibratile in the direction parallel to one pair of parallel legs thereof, a signal coil coupled to the core and means for polarizing the core such that magnetostrictive effects of like sign are produced in the pair of legs noted. In one specific construction, the polarizing flux is produced by a permanent magnet having its poles opposite one end of the core so that the core defines two paths, magnetically in parallel, one of the paths being composed of the pair of legs noted and one of the transverse portions or arms of the core and the other path being composed of the other transverse arm of the core. The latter arm is provided with a short portion of restricted cross-section which provides a high reluctance for the direct current polarizing flux traversing this arm. Thus, a high flux density is obtained in the pair of parallel legs noted without saturation of the second path for the direct current flux. The effect of the portion of restricted cross-section upon the direct current flux in the arm in which it is included is large. However, the effect of this portion upon the alternating flux, the path for which is serially around the core, is relatively small because of the short length of this portion and due to the inherent difference in the alternating current and direct current permeabilities thereof. Thus, a magnetically efficient core providing a low reluctance path for the signal flux and wherein the requisite flux density in the oscillatory legs is obtainable with a relatively small magnet is realized.

The invention and the various features thereof will be understood more clearly and fully from the following detailed description with reference to the accompanying drawing, in which:

Fig. 1 is a perspective view of a submarine signaling device illustrative of one embodiment of this invention, portions of the device being broken away to show details of construction more clearly;

Fig. 2 is a detail view of the core and parts of the polarizing magnet included in the device shown in Fig. 1, illustrating typical paths for the direct current and signal fluxes; and Figs. 3 and 4 are diagrams illustrating core constructions illustrative of other embodiments of this invention.

Referring now to the drawing, the signaling device illustrated in Fig. 1 comprises an annular foundation member or support 10 of non-magnetic material, for example brass or aluminum, and having a raised portion 11. The foundation member 10 is seated upon and secured to a ring 12, also of non-magnetic material, which in turn is suitably secured to a wall 13 of a casing in which the device is mounted. Carried by the foundation member is a body 14 of a material capable of efficiently transmitting supersonic compressional wave energy. In a particularly advantageous construction, this body is of a soft rubber free of air cells therein and having substantially the same density and impedance for the transmission of compressional wave energy as sea water. The body 14 is provided with an annular flange 15 which is secured against a seating surface upon the support 10 by a clamping ring 16.

A magnetostrictive core, designated as a whole as 17, bears against the body 14 and is spaced from a flange 18 on the support 10 by a resilient gasket 19. Mounted on the raised portion 11 of the support 10 is a permanent magnet 20, of generally horseshoe form, having its poles opposite one end of the magnetostrictive core 17. The magnet is secured in position by a non-magnetic clamping bar 21 which bears against resilient spacers or pads 22 and is affixed to the support by screws 23. A cover 24, seated upon the support 10, is held in place by screws 25, only one of which is shown, passing through resilient spacers or pads 26 and threaded into the clamping bar 21. A signal coil 27 encompasses one of the legs of the core 17 and is supported from the flange 18, the internal dimensions of the coil being such as to provide clearance between the coil and core so that the coil will not impede motion of the core.

The core 17 is of generally rectangular form and is formed of a plurality of laminae of magnetostrictive material such as, for example, an alloy comprising of the order of 45 per cent nickel and balance principally iron, the several laminae being secured together as by a suitable cement. The laminae may be provided with apertures 28 into which the cement flows. Specifically, each lamination of the core comprises a base 29 in intimate engagement with the body 14, a pair of parallel legs 30a and 30b and a transverse arm 31. Advantageously, the body 14 and the core 17 are constructed and arranged to constitute a half-wavelength resonator having a vibrational node adjacent the portion of the leg 30a encompassed by the signal coil 27, the frequency of resonance being that at which the device is intended to operate, if single frequency operation is desired, or the mean frequency, if the device is intended for band frequency operation.

As illustrated clearly in Fig. 2, the poles of the magnet 20 are opposite the ends of the transverse arm 31 of the core so that, for the magnet polarity indicated in Fig. 2, the direct current polarizing flux flows in the directions indicated by the solid arrows, one path for this flux being through the arm 31 and the other path being through the leg 30a, base 29 and leg 30b in series. When a signal current is supplied to the coil 27 or compressional waves are transmitted to the core through the body 14, an alternating component of flux is superimposed upon the direct current flux, the flow of the signal flux component being around the core, i. e., through the leg 30a, base 29, leg 30b and arm 31 in series, as indicated by the dotted arrows in Fig. 2. It will be appreciated, then, that the core provides a closed magnetic path of low reluctance for the alternating flux component so that an efficient magnet circuit is realized. Inasmuch as the sign of the flux change in the two legs 30a and 30b, due to the signal flux, is the same for both legs, it will be seen that the two legs will expand and contract in unison and thus transfer energy cophasically to the body 14 through which the signals are transmitted to the sea water. Conversely, the effect of the two legs 30 in response to compressional wave signals incident upon the body 14 will be cumulative around the core.

As is known, optimum magnetostrictive effect is realized when the magnetostrictive core is polarized to a prescribed point, or, stated in another way, optimum operation requires that the flux density in the legs 30a and 30b be of prescribed value. The realization of this flux density requires a magnet of a strength dependent upon the reluctance of the direct current path through the arm 31. It will be apparent that if this reluctance is small, the total flux required to be supplied by the magnet 20 in order to produce the optimum flux density in the legs 30 will be large. On the other hand, if this arm is made of small cross-section throughout to increase its reluctance, this arm may become saturated when the desired flux density is produced in the legs 30 and, consequently, the reluctance of the path for the alternating flux would be large.

In accordance with a feature of this invention, the arm 31 is so constructed that the reluctance thereof to the flow of direct current flux is high while its reluctance to alternating flux is relatively low whereby the flux density in the legs 30 requisite for optimum magnetostrictive action can be obtained by use of a relatively small magnet. Specifically, as illustrated in Figs. 1 and 2, each lamination of the core is provided with a narrow slot or opening 32 in and extending transversely of the arm 31. The slots or apertures 32, it will be noted, produce a localized reduction in the cross-section of material in the arm 31, advantageously to less than the cross-section of each of the legs 30. Hence, the total direct current reluctance of the path defined by the arm 31 is high and the requisite flux density in the legs 30 can be obtained without saturation of the arm 31 and, as will be apparent, by the use of a relatively small magnet. In general, as is known, the direct current permeability of a magnetic material is large in comparison to the alternating current permeability. Hence, the short gap of substantial cross-sectional area defined by the slots or apertures 32 has a large effect upon the direct current reluctance of the path defined by the arm 31 while the effect of this gap upon the reluctance of the path, serially around the core, for alternating flux is small. Thus, the requisite flux density in the legs 30 can be obtained without substantial reduction in the efficiency of the core as a closed series circuit for the alternating flux.

Modifications of the construction shown in Figs. 1 and 2 are illustrated in Figs. 3 and 4. In the construction illustration in Fig. 3, each lamination of the core is provided with a constriction 132 whereby the direct current reluctance of the arm 31 is substantially increased with only minor effect upon the total reluctance of the path for the signal flux. In Fig. 4, the increase in direct current reluctance of the arm 31 is obtained by providing a short air-gap 232 in the path defined by this arm. In both the constructions illustrated in Figs. 3 and 4, the direct current polarizing flux may be obtained from a bar magnet 120 within the core, adjacent the arm 31 and having its poles adjacent the ends of this arm. Alternatively, of course, a horseshoe form magnet, as shown in Fig. 1, may be employed in place of the bar magnet in the constructions illustrated in Figs. 3 and 4.

Although specific embodiments of this invention have been shown and described, it will be understood that they are but illustrative and that various modifications may be made therein without departing from the scope and spirit of this invention as defined in the appended claims.

What is claimed is:

1. A magnetostrictive device comprising a core defining a magnetic loop and having therein a portion of greater reluctance than the remainder of the loop and a magnetostrictive portion separate from said first portion, a signal coil electromagnetically coupled to said loop, means mounting said core for substantially free vibration, and a permanent magnet having its poles opposite the ends of said first portion.

2. A signaling device comprising a core including parallel magnetostrictive legs and portions defining a series magnetic circuit with said legs, one of said portions having a section of high direct current reluctance, a permanent magnet having its poles opposite the ends of said one portion and remote from the other of said portions, and means for driving said legs longitudinally and in the same direction.

3. A magnetostrictive device comprising a closed magnetic circuit, means for polarizing said circuit, said circuit being defined by two branches magnetically in parallel with respect to the direction of flow of the polarizing flux therethrough, one of said branches including a linear portion of magnetostrictive material and the other of said branches having a restricted section of high direct current reluctance, and means for actuating said linear portion in the direction of its length.

4. A signal translating device comprising a core including a U-shaped portion of magnetostrictive material and an arm bridged across the ends of said portion, means mounting said core for oscillation thereof parallel to the arms of said U-shaped portion, means for polarizing said U-shaped portion and said arm magnetically in parallel and a signal coil coupled to said U-shaped portion, said arm having therein a restricted section of high reluctance.

5. A signal translating device comprising a magnetostrictive core having a pair of parallel legs and arms bridging said legs, means mounting said core for vibration parallel to said legs, one of said arms having a restricted portion of reduced cross-section, a signal coil coupled to said core, and a permanent magnet having its poles opposite the ends of said one arm.

6. A signal translating device comprising a substantially rectangular magnetostrictive core, means mounting said core for vibration parallel to one pair of opposite sides thereof, a signal coil coupled to said core, one of the other sides of said core having therein a restricted slot extending transversely thereof, and a permanent magnet having its poles opposite the ends of said one other side.

7. A signal translating device comprising a core of magnetostrictive material including a pair of parallel legs and a pair of arms bridging said legs and defining a closed magnetic loop therewith, a signal coil coupled to said core, means mounting said core for oscillation parallel to said legs, and a permanent magnet having its poles opposite the ends of one of said arms, said one arm having a restricted portion of reduced cross-section.

8. A signal translating device comprising a laminated magnetostrictive core including a base portion, a pair of parallel legs extending from said base portion and an arm bridging said legs, means mounting said core for vibration parallel to said legs, a compressional wave signal transmitting body in engagement with said base portion, a signal coil coupled to said core, said arm having therein a restricted portion of reduced cross-section, and means for establishing a polarizing flux in said core traversing two paths in parallel, one of said paths including said restricted portion and the other of said paths comprising said legs and said base portion in series.

ROBERT L. PEEK, Jr.

REFERENCES CITED

The following references are of record in the file of this patent:

UNITED STATES PATENTS

| Number | Name | Date |
| --- | --- | --- |
| 2,249,835 | Lakatos | July 22, 1941 |
| 1,588,547 | Golladay | June 15, 1926 |
| 1,876,164 | Pridham | Sept. 6, 1932 |
| 1,709,571 | Harrison | Apr. 16, 1929 |
| 1,704,084 | Hayes | Mar. 5, 1929 |